US012725866B2

(12) United States Patent
Zhao

(10) Patent No.: US 12,725,866 B2
(45) **Date of Patent: *Sep. 1, 2026**

(54) END INSULATING PLATE, BATTERY DEVICE, AND ASSEMBLY METHOD OF BATTERY DEVICE

(71) Applicant: CALB Co., Ltd., Jiangsu (CN)

(72) Inventor: Dong Zhao, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 961 days.

This patent is subject to a terminal disclaimer.

(21) Appl. No.: 17/947,191

(22) Filed: Sep. 19, 2022

(65) Prior Publication Data

US 2023/0335844 A1 Oct. 19, 2023

(30) Foreign Application Priority Data

Apr. 14, 2022 (CN) ......................... 202210395581.8

(51) Int. Cl.
*H01M 50/233* (2021.01)
*H01M 50/204* (2021.01)
*H01M 50/262* (2021.01)

(52) U.S. Cl.
CPC ....... *H01M 50/233* (2021.01); *H01M 50/204* (2021.01); *H01M 50/262* (2021.01)

(58) Field of Classification Search
CPC ............. H01M 50/209; H01M 50/242; H01M 50/244; H01M 50/291
See application file for complete search history.

(56) References Cited

FOREIGN PATENT DOCUMENTS

| | | | |
|---|---|---|---|
| CN | 212967907 | * | 4/2021 |
| CN | 113437425 | | 9/2021 |
| CN | 219534826 | | 8/2023 |

OTHER PUBLICATIONS

"Office Action of China Counterpart Application", issued on Nov. 21, 2025, p. 1-p. 7.
"Search Report of Europe Counterpart Application", issued on Aug. 29, 2023, p. 1-p. 7.
"Examination report of India Counterpart Application", issued on Dec. 12, 2025, p. 1-p. 6.

* cited by examiner

*Primary Examiner* — Brittany L Raymond
(74) *Attorney, Agent, or Firm* — JCIP GLOBAL INC.

(57) ABSTRACT

An end insulating plate is arranged in a battery device to insulate a battery set from other components. An adhesive overflow tank is arranged at one side of the end insulating plate facing away from the battery set. The adhesive overflow tank includes an adhesive feed area and an adhesive storage area, and an adhesive feed port is provided at one side of the adhesive feed area facing the bottom surface of the end insulating plate. The adhesive storage area communicates with the adhesive feed area, and a baffle structure for blocking adhesive is provided at one side of the adhesive storage area close to the bottom surface of the end insulating plate. The adhesive overflow tank is configured to allow adhesive to enter the adhesive feed area from the adhesive feed port, and enter the adhesive storage area from the adhesive feed area.

20 Claims, 6 Drawing Sheets

FIG.6

END INSULATING PLATE, BATTERY DEVICE, AND ASSEMBLY METHOD OF BATTERY DEVICE

CROSS-REFERENCE TO RELATED APPLICATION

This application claims the priority benefit of China application no. 202210395581.8, filed on Apr. 14, 2022. The entirety of the above-mentioned patent application is hereby incorporated by reference herein and made a part of this specification.

BACKGROUND

Technical Field

The present disclosure relates to the technical field of batteries, in particular to an end insulating plate, a battery device and an assembly method for battery device.

Description of Related Art

In the assembly process of a battery device, both ends of each battery set are generally adhered to end insulating plates, and then put into a box body. Moreover, before placing the battery set with end insulating plates bonded at both ends into the box body, pasting will be applied to the end insulating plate and/or beams to ensure that the battery set placed in the box body is bonded to the beam. However, before placing the battery set into the box body, the pasting applied in advance will contact other positions due to scratching or rubbing, resulting in low bonding strength after coating and curing and/or improper configuration of end insulating plate and so on, which directly affects the assembly yield of the battery device and hinders industrial production.

SUMMARY

The present disclosure provides an end insulating plate, a battery device and an assembly method of the battery device.

In a first aspect, the present disclosure provides an end insulating plate, which is used to be arranged in a battery device to insulate a battery set from other components. An adhesive overflow tank is arranged at one side of the end insulating plate facing away from the battery set. The adhesive overflow tank includes an adhesive feed area and an adhesive storage area, and an adhesive feed port is provided at one side of the adhesive feed area facing the bottom surface of the end insulating plate. The adhesive storage area communicates with the adhesive feed area, and a baffle structure for blocking adhesive is provided at one side of the adhesive storage area close to the bottom surface of the end insulating plate. The adhesive overflow tank is configured to allow adhesive to enter the adhesive feed area from the adhesive feed port, and enter the adhesive storage area from the adhesive feed area.

In the present disclosure, an adhesive overflow tank is provided at one side of the end insulating plate facing away from the battery set. During the assembly process of the battery device, it is not necessary to apply adhesive on the entire bonding surface of the end insulating plate facing away from the battery set in advance. It is only required to pre-apply some adhesive at the vertical corner formed by the beam and the bottom plate of box body. When the battery set is placed into the box, the pre-applied adhesive will be pressed into the adhesive overflow tank along the adhesive feed port under the adhesive overflow tank. In addition, since the curing of the structural adhesive (changing from liquid to solid) generally takes some time, during this process, the adhesive will flow towards the bottom surface of the end insulating plate due to the effect of gravity, and then flow between the battery set and the bottom plate. In this embodiment, the adhesive overflow tank includes an adhesive feed area and an adhesive storage area. The adhesive may enter the adhesive feed area from the adhesive feed port, and enter the adhesive storage area from the adhesive feed area.

In a second aspect, the present disclosure provides a battery device, the battery device includes a beam, a battery set, and an end insulating plate as described above. The beam encloses a chamber, and the end insulating plate and the battery set are disposed in the chamber. The end insulating plate is disposed between the beam and the battery set, and one side of the end insulating plate provided with the adhesive overflow tank faces the beam.

In the battery device of the present disclosure, an adhesive overflow tank is provided at one side of the end insulating plate facing away from the battery set. During the assembly process of the battery device, it is not necessary to apply adhesive on the entire bonding surface of the end insulating plate in advance. It is only required to pre-apply some adhesive at the vertical corner formed by the beam and the bottom plate of box body. When the battery set is placed into the box, the pre-applied adhesive will be pressed into the adhesive overflow tank along the adhesive feed port under the adhesive overflow tank. In addition, the adhesive overflow tank includes an adhesive feed area and an adhesive storage area. The adhesive may enter the adhesive feed area from the adhesive feed port and enter the adhesive storage area from the adhesive feed area.

In a third aspect, the present disclosure provides a method for assembling a battery device, includes the following steps.

A box body of the battery device is provided. A beam is arranged inside the box body, the beam encloses a chamber, and adhesive is arranged at the angle formed by the beam and the bottom plate of the box body.

A clamping tool is used to press the battery set and the end insulating plate into the chamber. The end insulating plate is arranged between the beam and the battery set, and an adhesive overflow tank is provided at one side of the end insulating plate facing away from the battery set. The adhesive overflow tank includes an adhesive feed area and an adhesive storage area, and an adhesive feed port is provided on one side of the adhesive feed area facing the bottom surface of the end insulating plate. The adhesive storage area communicates with the adhesive feed area, and a baffle structure for blocking adhesive is provided at one side of the adhesive storage area close to the bottom of the end insulating plate. The adhesive overflow tank is configured to allow adhesive to enter the adhesive feed area from the adhesive feed port, and enter the adhesive storage area from the adhesive feed area. One side of the end insulating plate provided with the adhesive overflow tank faces the beam. When the battery set is assembled in place, the adhesive is squeezed into the adhesive overflow tank from the adhesive feed port.

In the assembly method of the battery device provided in this embodiment, adhesive overflow is adopted to replace pasting. In addition, in this embodiment, the adhesive overflow tank includes an adhesive feed area and an adhesive storage area. The adhesive may enter the adhesive feed area from the adhesive feed port, and enter the adhesive storage area from the adhesive feed area.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

To facilitate understanding of the present disclosure, reference may be made to the embodiments shown in the following figures. The components in the drawings are not necessarily to scale, and some related components may be omitted in order to emphasize and clearly illustrate the technical features of the present disclosure. Additionally, the relevant elements or components may be arranged differently from those known in the art.

FIG. 6 is a flowchart of a method for assembling a battery device according to an embodiment of the present disclosure.

DESCRIPTION OF THE EMBODIMENTS

Figure 1:
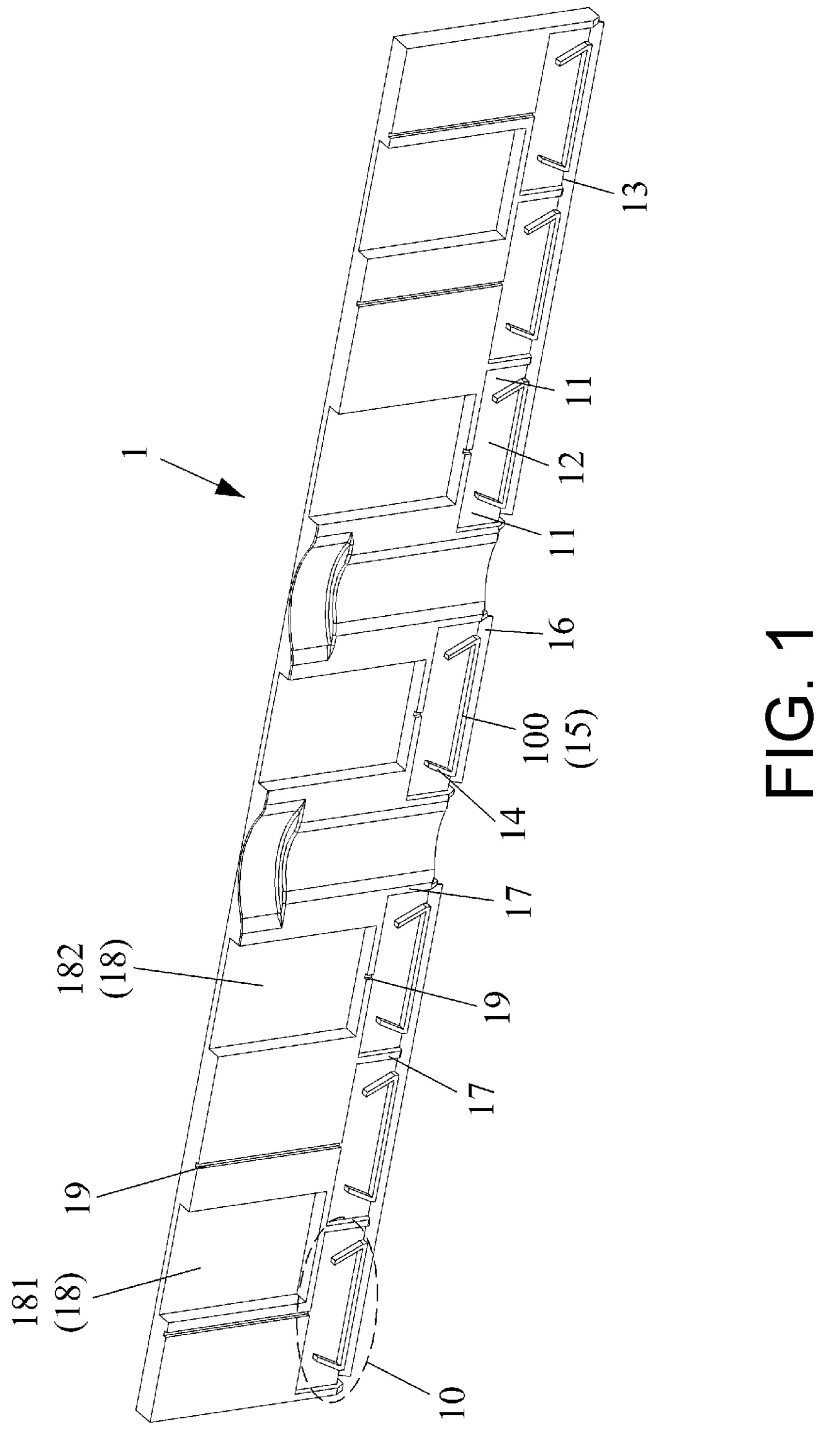
FIG. 1 is a schematic structural view of an end insulating plate according to an embodiment of the present disclosure.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

In the related art, the box body of the battery pack is provided with a chamber enclosed by beams, and the battery set is directly inserted into the chamber surrounded by the beams. In order to increase the insulation performance, avoid damage to the battery, and reduce friction, end insulating plates are set at both ends of the battery set. In this way, if adhesive is not applied between the end insulating plate and the beam, in the use process of the battery pack, the battery set will be easily shifted or even detach from the chamber due to vibration and other reasons, and danger will arise. However, if the end insulating plate is applied with adhesive and put into the chamber, in the process of entering the chamber, the adhesive will contact other positions due to scratching and rubbing, and the actually remaining adhesive will be little and uneven, making it difficult to achieve the purpose of the fixing the battery. In addition, the process of transferring the end insulating plate and the battery set into the chamber requires a clamp to clamp the end insulating plate, and further, the adhesive applied on the end insulating plate will contaminate the clamp.

In view of this, the inventor of the present disclosure designed a technical solution of applying adhesive at the included angle between the beam and the bottom plate, and making the beam adhere to the end insulating plate of the battery set by means of overflowing adhesive, so as to improve the assembly yield of the battery set, strengthen the fixing strength of the battery set, and improve the yield of the entire battery device.

In the first aspect, as shown in FIG. 1, FIG. 2, FIG. 3, FIG. 4, and FIG. 5, the present disclosure provides an end insulating plate 1, which is arranged in a battery device to insulate the battery set 2 from other components. An adhesive overflow tank 10 is provided on one side of the end insulating plate 1 facing away from the battery set 2. The adhesive overflow tank 10 includes an adhesive feed area 11 and an adhesive storage area 12. An adhesive feed port 13 is provided at one side of the adhesive feed area 11 facing the bottom surface of the end insulating plate 1. The adhesive storage area 12 communicates with the adhesive feed area 11, and a baffle structure 100 for blocking the adhesive is provided at one side of the adhesive storage area 12 close to the bottom surface of the end insulating plate 1. The adhesive overflow tank 10 is configured to allow the adhesive to enter the adhesive feed area 11 from the adhesive feed port 13 and enter the adhesive storage area 12 from the adhesive feed area 11.

Figure 4:
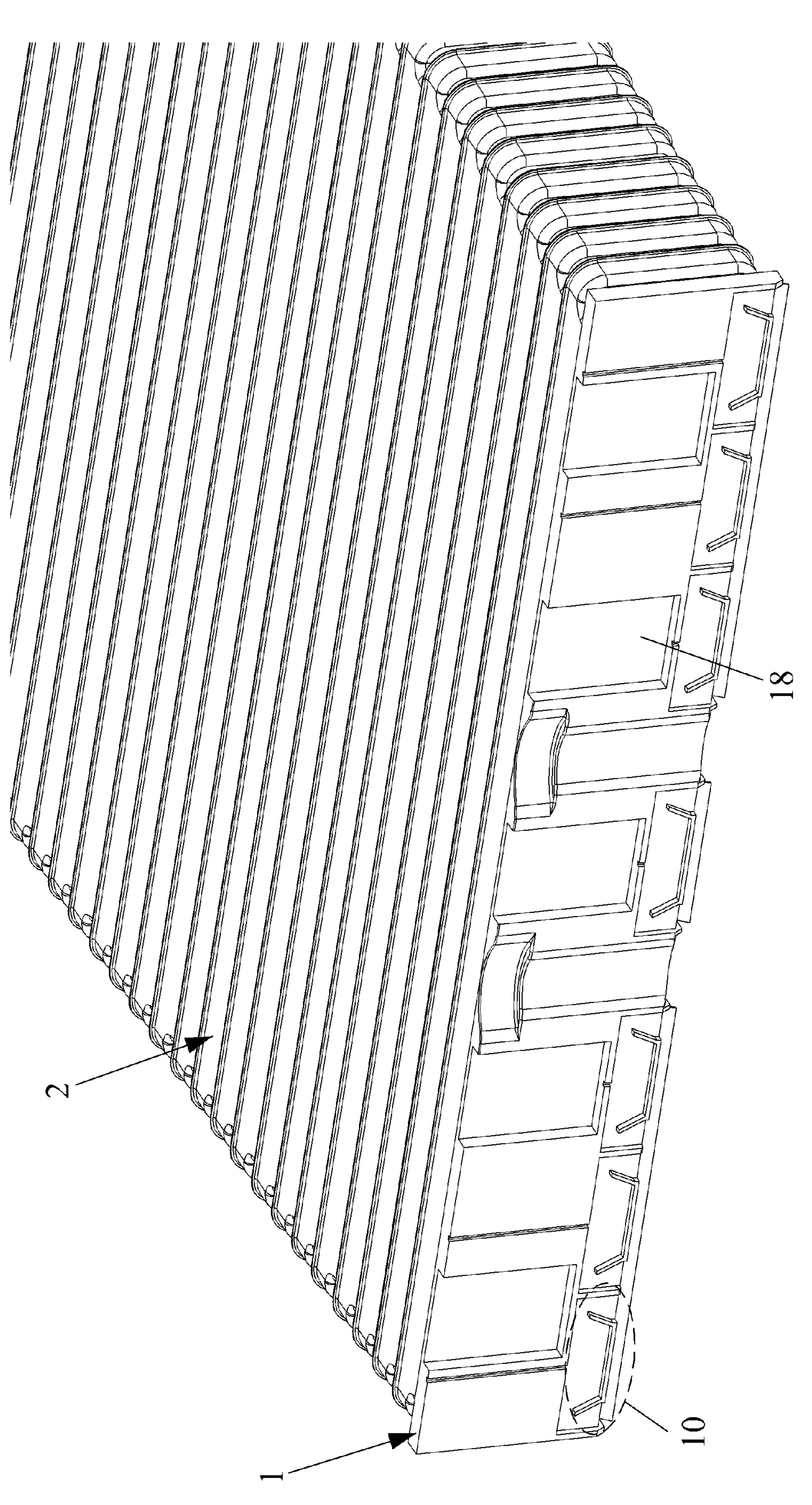
FIG. 4 is a schematic partial structural view of a battery set using an end insulating plate in an embodiment of the present disclosure according to an embodiment of the present disclosure.
Figure 5:
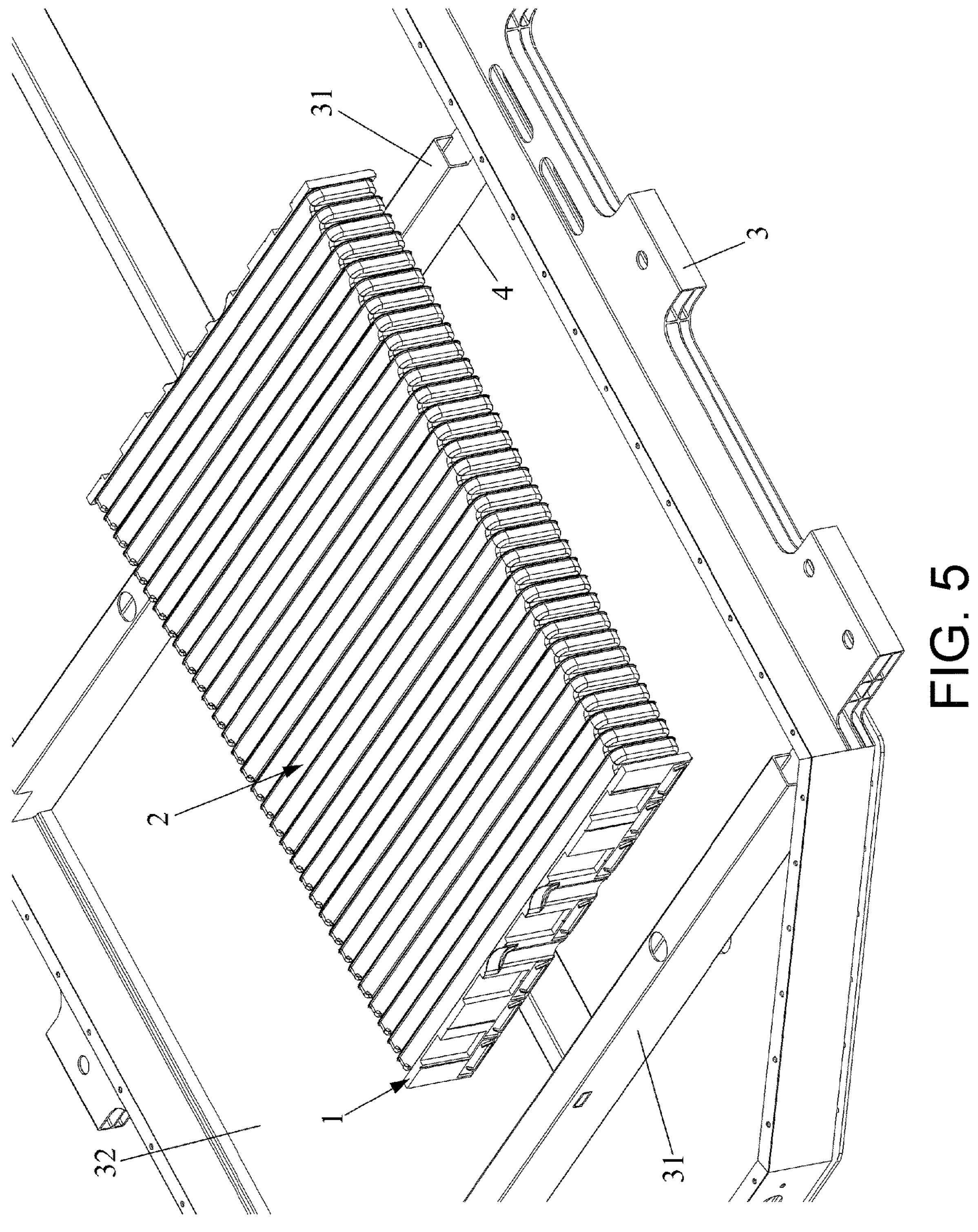
FIG. 5 is a schematic structural view of a battery set of a battery device being placed into a box according to an embodiment of the present disclosure.

As shown in FIG. 4 and FIG. 5, the end insulating plate 1 provided by the present disclosure may be arranged on the peripheral side of the battery set 2, and the battery set 2 and the end insulating plate 1 are assembled together in a box body 3 of the battery device to form the battery device. A beam 31 is arranged inside the box body 3 of the battery device. The beam 31 encloses a chamber, the battery set 2 is arranged in the chamber, and the end insulating plate 1 is arranged between the battery set 2 and the beam 31 of the box body 3, and is adhered to the beam 31.

In the present disclosure, an adhesive overflow tank 10 is provided at one side of the end insulating plate 1 facing away from the battery set 2. During the assembly process of the battery device, it is not necessary to apply adhesive on the entire bonding surface of the end insulating plate 1 facing away from the battery set 2 in advance. It is only required to pre-apply some adhesive at the vertical corner formed by the beam 31 and the bottom plate 32 of box body 3. When the battery set 2 is placed into the box, the pre-applied adhesive will be pressed into the adhesive overflow tank 10 along the adhesive feed port 13 under the adhesive overflow tank 10. Due to the accommodation and guiding effect of the adhesive overflow tank 10, the adhesive will not overflow or be in contact with other positions, so the assembly yield of the battery device will not be affected. In addition, since the curing of the structural adhesive (changing from liquid to solid) generally takes some time, during this process, the adhesive will flow towards the bottom surface of the end insulating plate 1 due to the effect of gravity, and then flow between the battery set 2 and the bottom plate 32. In this embodiment, the adhesive overflow tank 10 includes an adhesive feed area 11 and an adhesive storage area 12. The adhesive may enter the adhesive feed area 11 from the adhesive feed port 13, and enter the adhesive storage area 12 from the adhesive feed area 11. Due to the baffle structure 100 under the adhesive storage area 12, the adhesive that flows downward may be prevented from flowing out of the adhesive overflow tank 10 before being completely cured. In this manner, it is possible to ensure the final adhesive amount and bonding area between the end insulating plate 1 and the beam 31, and the bonding firmness may be improved. To sum up, the end insulating plate provided by the present disclosure may make the connection effect between the battery set 2 and the beam 31 of the battery device better, and the assembly yield of the battery device is higher, which facilitates industrial production.

Figure 2:
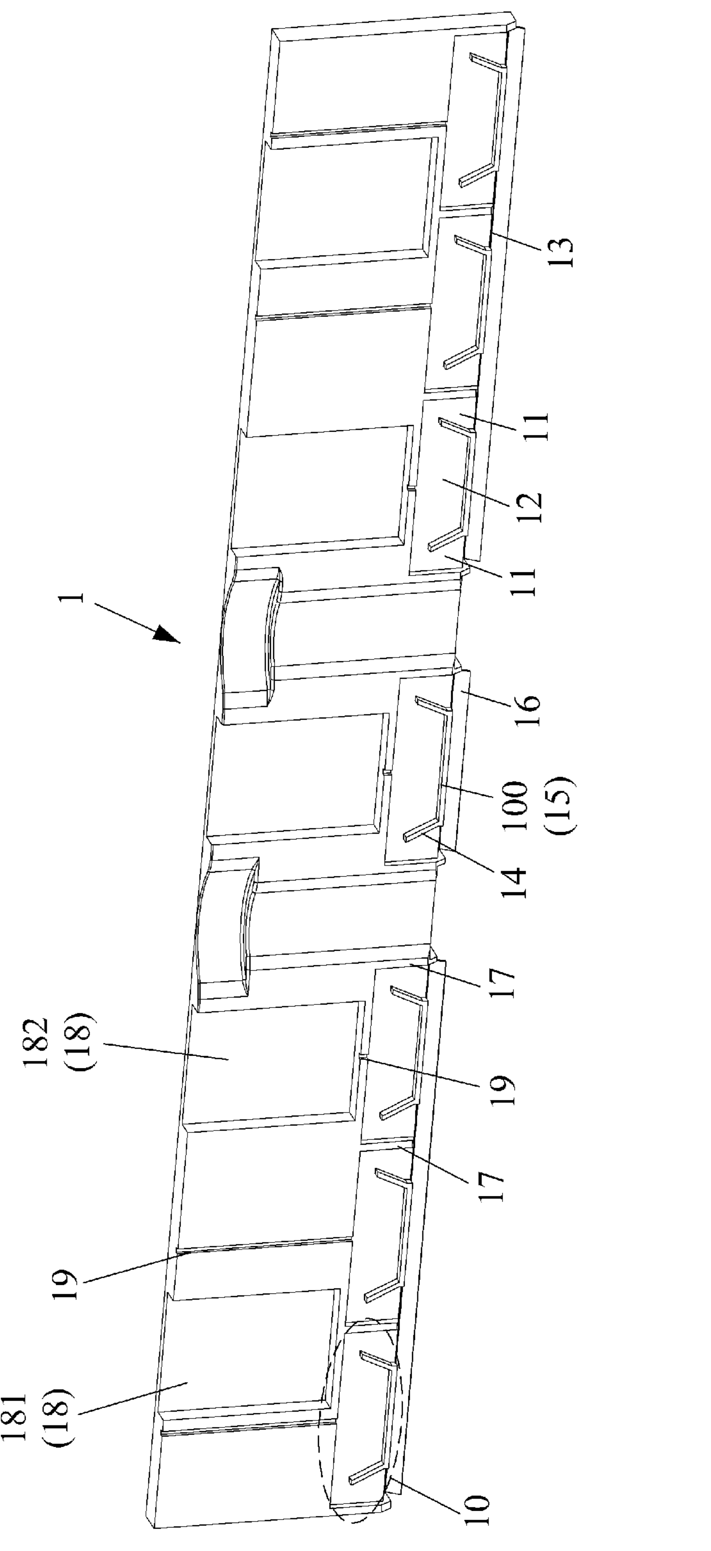
FIG. 2 is a schematic structural view of an end insulating plate according to another embodiment of the present disclosure.

In some embodiments, as shown in FIG. 1, FIG. 2 and FIG. 5, the adhesive feed area 11 and the adhesive storage area 12 are arranged in a direction parallel to the bottom surface of the end insulating plate 1, and the adhesive feed area 11 and the adhesive storage area 12 both are close to the bottom of the end insulating plate 1. That is, the entire adhesive overflow tank 10 is close to the bottom of the end insulating plate 1, so that the adhesive 4 may be squeezed into the adhesive overflow tank 10. Moreover, the end insulating plate 1 is generally higher than the beam 31. The bottom of the adhesive overflow tank 10 close to the end insulating plate 1 may be directly opposite to the beam 31, which makes it easy for the adhesive in the adhesive overflow tank 10 to adhere to the beam 31.

Exemplarily, in the adhesive overflow tank 10, the adjacent adhesive feed area 11 and the adhesive storage area 12 are separated by a first partition plate 14 and communicate with each other at one end of the first partition plate 14 away from the bottom surface of the end insulating plate 1.

Specifically, the adhesive in the adhesive feed area 11 rolls over the first partition plate 14 and enters the adhesive storage area 12, and then gradually flows along the first partition plate 14 toward the bottom of the adhesive storage area 12. In this manner, the moving track of the adhesive in the adhesive overflow tank 10 becomes longer, and the retention time of the adhesive in the adhesive overflow tank 10 is prolonged, which can make the adhesive distribution more even, and effectively prevent the adhesive from flowing back into the adhesive feed area 11 and flowing out of the adhesive overflow tank 10.

Exemplarily, the baffle structure 100 may be configured as a second partition plate 15, and one end of the first partition plate 14 close to the bottom surface of the end insulating plate 1 is connected to the second partition plate 15. In this way, the second partition plate 15 and the first partition plate 14 enclose at least part of the wall of the adhesive storage area 12. The second partition plate 15 is configured as the lower bottom wall of the adhesive storage area 12, and the first partition plate 14 is configured as the side wall of the adhesive storage area 12, so that the blocked area of the adhesive storage area 12 is larger, and the adhesive may be prevented from flowing out of the adhesive storage area 12 from both sides of the second partition plate 15. In this way, the final adhesive amount and bonding area between the end insulating plate 1 and the beam 31 may be ensured, and the bonding firmness may be enhanced.

Figure 3:
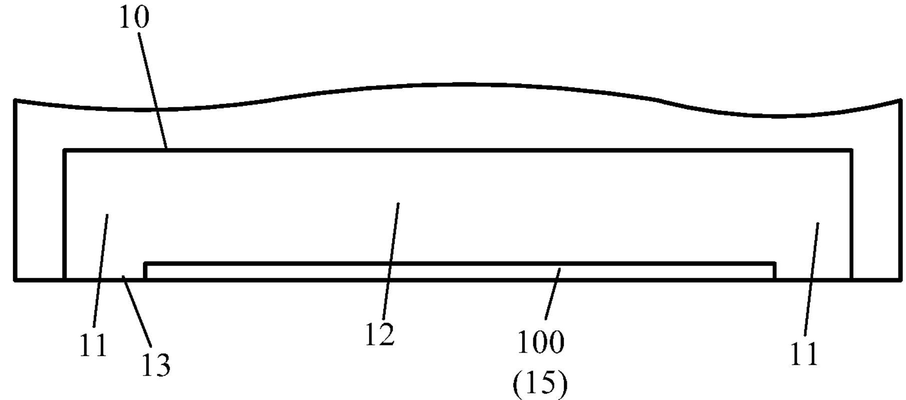
FIG. 3 is a schematic partial structural view of an end insulating plate according to still another embodiment of the present disclosure.

Alternatively, as shown in FIG. 3, there may be no first partition plate 14 between the adjacent adhesive feed area 11 and the adhesive storage area 12. After entering the adhesive feed area 11 from the adhesive feed port 13, the adhesive may directly flow horizontally toward the adhesive storage area 12, and be blocked by the second partition plate 15 under the adhesive storage area 12 so as not to flow out of the adhesive overflow tank 10.

In some embodiments, the first partition plate 14 is not vertically arranged with respect to the bottom surface of the end insulating plate 1, that is, the first partition plate 14 is not arranged vertically but is arranged obliquely.

In an exemplary embodiment, as shown in FIG. 1, one end of the first partition plate 14 away from the bottom surface of the end insulating plate 1 is inclined toward the adhesive storage area 12 with respect to one end of the first partition plate 14 close to the bottom surface of the end insulating plate 1. That is, the top of the first partition plate 14 is inclined toward one side close to the adhesive storage area 12. In this way, the first partition plate 14 has a guiding function, and the adhesive may overflow upward along the first partition plate 14 until the adhesive rolls over the first partition plate 14 and flows into the adhesive storage area 12, which helps the adhesive to flow into the adhesive storage area 12, and facilitates to increase the amount of adhesive overflow and the adhesive overflow area.

In another exemplary embodiment, as shown in FIG. 2, one end of the first partition plate 14 away from the bottom surface of the end insulating plate 1 is inclined toward the adhesive feed area 11 with respect to one end of the first partition plate 14 close to the bottom surface of the end insulating plate 1. That is, the top of the first partition plate 14 is inclined toward one side close to the adhesive feed area 11. In this way, the opening size of the adhesive feed port 13 is larger, which facilitates the entry of more adhesive into the adhesive overflow tank 10, and helps to increase the amount of adhesive overflow and the adhesive overflow area.

In some embodiments, as shown in FIG. 1 and FIG. 2, the adhesive overflow tank 10 includes at least one adhesive feed area 11 and one adhesive storage area 12. The adhesive feed area 11 and the adhesive storage area 12 are alternately arranged, and each adhesive feed area 11 communicates with each adhesive storage area 12. In this way, the adhesive in each adhesive feed area 11 can flow into the two adjacent adhesive storage areas 12 on the left and right, and/or each adhesive storage area 12 can receive the adhesive from the two adjacent adhesive feed areas 11 on the left and right, thereby facilitating squeezing adhesive overflow and adhesive storage. In this manner, the distribution of adhesive is more even and the bonding firmness is improved.

Exemplarily, each adhesive overflow tank 10 includes an adhesive storage area 12 and two adhesive feed areas 11 located on both sides of the adhesive storage area 12, and the adhesive storage area 12 communicates with two adhesive feed areas 11 adjacent thereto respectively. In this way, each adhesive storage area 12 is used to receive adhesive from the two adjacent adhesive feed areas 11 on the left and right, and the adhesive overflow tank 10 has two adhesive feed ports 13, which can speed up the rate of adhesive overflowing into the adhesive overflow tank 10 and improve the squeezing effect of adhesive overflow, making the distribution of adhesive more even, and further improving the bonding firmness.

In some embodiments, as shown in FIG. 1 and FIG. 2, the end insulating plate 1 provided by the present disclosure includes a plurality of adhesive overflow tanks 10 arranged in a direction parallel to the bottom surface of the end insulating plate 1, and support ribs 17 are provided between adjacent adhesive overflow tanks 10.

Specifically, the support ribs 17 may enhance the strength of the end insulating plate 1 to prevent the end insulating plate 1 from being lack of strength at the adhesive overflow tank 10 and avoid the occurrence of damage or deformation caused by force from affecting the bonding, fixing and protection effect on the battery set 2.

Exemplarily, the support rib 17 is a strip-shaped structure protruding from the bottom wall of the adhesive overflow tank 10. Specifically, the support rib 17 extends substantially in a direction perpendicular to the bottom plate 32 of the battery device, and the support rib 17 may directly serve as a side wall of the adhesive overflow tank 10, thereby effectively strengthening the structural strength of the adhesive overflow tank 10, and increasing the layout space of the adhesive overflow tank 10 while increasing the adhesive overflow area. For example, each adhesive overflow tank 10 includes an adhesive storage area 12 and two adhesive feed areas 11 on both sides of the adhesive storage area 12. The support ribs 17 between the adjacent adhesive overflow tanks 10 may be directly used as the side walls of the two adjacent adhesive storage areas 12. In addition, since the support rib 17 extends in a direction perpendicular to the bottom plate 32 of the battery device, the support rib 17 does not affect the adhesive overflowing from bottom to top, and has a guiding effect on the overflowing adhesive, so the uniformity of the adhesive overflowing may also be improved.

In an exemplary embodiment, at least part of the support ribs 17 may extend to the bottom of the end insulating plate 1. In this way, it is possible to improve the supporting and positioning effect of the end insulating plate 1, and facilitate the arrangement of structures such as arranging the adhesive baffle plate 16 at the bottom of the end insulating plate 1.

In some embodiments, as shown in FIG. 1 and FIG. 2, an adhesive baffle plate 16 is disposed at the bottom of the end insulating plate 1, and the adhesive baffle plate 16 may be bent. Specifically, the adhesive baffle plate 16 is configured to be bent toward one side of the end insulating plate 1 provided with the adhesive overflow tank 10, so as to push the adhesive at the bottom of the end insulating plate 1 toward the adhesive overflow tank 10. At least part of the adhesive baffle plate 16 is located at the adhesive feed port 13 of the adhesive overflow tank 10 to ensure that the adhesive can be pushed toward the adhesive feed port 13.

As shown in FIG. 1, FIG. 2 and FIG. 5, the end insulating plate 1 of this embodiment is provided with an adhesive baffle plate 16 at the bottom, and the adhesive baffle plate 16 can be bent toward one side of the adhesive overflow tank 10 to change from the first state to the second state. Further, in the process of assembling the end insulating plate 1 and the battery set 2 to the box body 3 of the battery device, it is not necessary to apply adhesive on the entire bonding surface of the end insulating plate 1 in advance. It is only required to apply some adhesive 4 at the vertical corner formed by the bottom plate 32 of box body 3 and the beam 31. In this way, from the process in which the adhesive baffle plate 16 of the end insulating plate 1 contacts the bottom plate 32 of the box body 3 to the process of assembly in place, the adhesive baffle plate 16 can be pressed by the bottom plate 32 of the box body 3 to change from the first state to the second state so that the adhesive 4 at the corner is squeezed to a position between the end insulating plate 1 and the beam 31. In this manner, the squeezed adhesive may enter the adhesive overflow tank 10 from the adhesive feed port 13, and finally the bonding strength is higher after coating and curing, and the bonding effect between the end insulating plate 1 and the beam 31 is better. In addition, since the adhesive baffle plate 16 is driven orientationally, the adhesive will not easily overflow or contact other positions, so the reduction of actual adhesive amount can be avoided, the bonding effect can be ensured, and the assembly yield of the battery device will not be affected. For example, it is possible to avoid the situation that the end insulating plate 1 is not arranged properly after the overpressure springs back. To sum up, the arrangement of the adhesive baffle plate 16 may further improve the assembly yield of the battery device, which facilitates industrial production.

Exemplarily, support ribs 17 are provided between adjacent adhesive baffle plates 16, and the support ribs 17 between adjacent adhesive baffle plates 16 extend to the bottom of the end insulating plate 1. In this way, through the support of the support ribs 17, it is easier to accommodate the adhesive baffle plate 16 between the bottom surface of the end insulating plate 1 and the bottom plate 32 of the battery device.

Exemplarily, a weak portion is provided at the root of the adhesive baffle plate 16 to facilitate bending, and the root is the portion where the adhesive baffle plate 16 is connected to the main body of the end insulating plate 1.

Specifically, the adhesive baffle plate 16 is a plate-like structure extending from the bottom of the main body of the end insulating plate 1. The root of the adhesive baffle plate 16 is a part of the adhesive baffle plate 16 connected to the main body of the end insulating plate 1. The root of the adhesive baffle plate 16 is relatively weak, and can be easily deformed by force, and the adhesive baffle plate 16 can be bent with its root as the rotation axis to switch between the first state and the second state.

In some embodiments, as shown in FIG. 1, FIG. 2 and FIG. 4, one side of the end insulating plate 1 facing away from the battery set 2 is further provided with an accommodating groove 18, and the accommodating groove 18 is located on one side of the adhesive overflow tank 10 away from the bottom surface of the end insulating plate 1. That is, the accommodating groove 18 is located above the adhesive overflow tank 10.

In an exemplary embodiment, there is no communication between the accommodating groove 18 and the adhesive overflow tank 10, and the accommodating groove 18 is used to accommodate the clamping tool cantilever, so as to clamp and transfer the battery set 2 by the clamping tool. For specific example, please refer to a first accommodating groove 181 in FIG. 1 and FIG. 2.

Exemplarily, along the direction perpendicular to the bottom surface of the end insulating plate 1, the height of the adhesive overflow tank 10 is 20% to 30% of the height of the end insulating plate 1, and the height of the accommodating groove 18 is 70% to 80% of the height of the end insulating plate 1.

Specifically, as shown in FIG. 1, FIG. 2, FIG. 4 and FIG. 5, the cantilever of the clamping tool may be inserted into the pre-designed accommodating groove 18 on the end insulating plate 1, and then the entire battery set 2 provided with the end insulating plate 1 is over-pressed into the box. By compressing the battery set 2 to a smaller size, the battery set 2 may be easily fit into the chamber of the box body 3 of the battery device. Under the circumstances, the cantilever of the clamping tool is located in the accommodating groove 18 and does not protrude from the bonding surface of the end insulating plate 1. In this way, the operation of placing the battery set 2 into the box is easier, and it is convenient for the clamping tool to be removed from the box body 3. In addition, the adhesive overflow tank 10 is an adhesive overflow area, and there is a raised baffle wall between the accommodating groove 18 and the adhesive overflow tank 10, so that there is no communication between the two. Accordingly, the adhesive in the adhesive overflow tank 10 will not enter the accommodating groove 18, so that the clamping tool cantilever will not contact the adhesive and the assembly process will not be affected.

In some embodiments, as shown in FIG. 1 and FIG. 2, one side of the end insulating plate 1 facing away from the battery set 2 is further provided with an exhaust slot 19, and the exhaust slot 19 is located on one side of the adhesive overflow tank 10 away from the bottom surface of the end insulating plate 1. That is, the exhaust slot 19 is located above the adhesive overflow tank 10; one end of the exhaust slot 19 is open, and the other end thereof communicates with the adhesive overflow tank 10.

Exemplarily, one or more exhaust slots 19 may be provided. For example, an exhaust slot 19 is correspondingly provided above each adhesive overflow tank 10, and the exhaust slot 19 communicates with the corresponding adhesive overflow tank 10.

Specifically, one end of the exhaust slot 19 is open, and the other end thereof communicates with the adhesive overflow tank 10, which may serve as an exhaust channel, which facilitates the discharge of air and the flow of adhesive in the adhesive overflow tank 10, and may improve the adhesive overflow effect, thereby increasing the connection strength of the beam 31 and the end insulating plate 1.

Moreover, the amount of adhesive overflow may be detected through the exhaust slot 19. For example, a slender detection bar or a detection strip is inserted into the exhaust slot 19 to detect whether the amount of adhesive overflow in the adhesive overflow tank 10 meets the design requirements, and the measurement principle may be similar to that of an oil dipstick. Specifically, by detecting the amount of adhesive overflow through the use of exhaust slot 19, it is possible to know whether the amount of adhesive overflow meets the predetermined requirements during the actual process operation. If the amount of adhesive overflow does not meet the requirements, it is possible to further strengthen the bonding strength by adding adhesive to ensure the bonding effect. For example, adhesive may be injected into the adhesive overflow tank 10 through the exhaust slot 19 to enhance the bonding effect and ensure the bonding effect.

Exemplarily, the exhaust slot 19 is a strip-shaped slot extending in a direction perpendicular to the bottom surface of the end insulating plate 1. The strip-shaped slot may facilitate the insertion of slender detection bar or detection strip, thereby improving the convenience and accuracy of the test operation.

In an exemplary embodiment, the exhaust slot 19 is located on one side of the adhesive storage area 12 away from the bottom surface of the end insulating plate 1, and the exhaust slot 19 communicates with the adhesive storage area 12. In this way, the air in the adhesive storage area 12 may be easily discharged, and it is favorable for the adhesive to flow from the adhesive feed area 11 to the adhesive storage area 12.

Of course, the design of the accommodating groove 18 and the exhaust slot 19 in the present disclosure is not limited to the above-mentioned embodiments. For example, in some embodiments, because the layout space above the adhesive overflow tank 10 is not big enough, there may also be a design in which the accommodating groove 18 and the exhaust slot 19 are arranged together. For example, the accommodating groove 18 and the exhaust slot 19 are not independent cavity structures, but communicate with each other in an up-down manner, and the accommodating groove 18 is connected to the adhesive overflow tank 10 through the exhaust slot 19 underneath. Under the circumstances, the accommodating groove 18 is not only used to accommodate the clamping tool cantilever, but also used for exhaust air. For specific example of the accommodating groove 18, please refer to the second accommodating groove 182 in FIG. 1 and FIG. 2 for details.

In a second aspect, the present disclosure provides a battery device. As shown in FIG. 4 and FIG. 5, the battery device includes a beam 31, a battery set 2, and an end insulating plate 1 as described above. The beam 31 encloses a chamber, and the end insulating plate 1 and the battery set 2 are arranged in the chamber. The end insulating plate 1 is arranged between the beam 31 and the battery set 2, and one side of end insulating plate 1 provided with the adhesive overflow tank 10 faces the beam 31.

As shown in FIG. 1, FIG. 2, FIG. 4 and FIG. 5, in the battery device of the present disclosure, an adhesive overflow tank 10 is provided at one side of the end insulating plate 1 facing away from the battery set 2. During the assembly process of the battery device, it is not necessary to apply adhesive on the entire bonding surface of the end insulating plate 1 in advance. It is only required to pre-apply some adhesive 4 at the vertical corner formed by the beam 31 and the bottom plate 32 of box body 3. When the battery set 2 is placed into the box, the pre-applied adhesive 4 will be pressed into the adhesive overflow tank along the adhesive feed port 13 under the adhesive overflow tank 10. Due to the accommodation and guiding effect of the adhesive overflow tank 10, the adhesive will not overflow or be in contact with other positions, so the assembly yield of the battery device will not be affected. In addition, the adhesive overflow tank 10 includes an adhesive feed area 11 and an adhesive storage area 12. The adhesive 4 may enter the adhesive feed area 11 from the adhesive feed port 13, and enter the adhesive storage area 12 from the adhesive feed area 11. Due to the baffle structure 100 under the adhesive storage area 12, the adhesive 4 that flows downward may be prevented from flowing out of the adhesive overflow tank 10 before being completely cured. In this manner, it is possible to ensure the final adhesive amount and bonding area between the end insulating plate 1 and the beam 31, and the bonding firmness may be improved. To sum up, the battery device provided by the present disclosure may make the connection effect between the battery set 2 and the beam 31 better, and the assembly yield of the battery device is higher, which facilitates industrial production.

In some embodiments, the battery device provided by the present disclosure further includes an adhesive layer located between the adhesive overflow tank 10 and the beam 31, the adhesive layer at least covers part of the adhesive storage area 12 of the adhesive overflow tank 10, and the end insulating plate 1 and the beam 31 are adhered through the adhesive layer.

Exemplarily, the adhesive layer covers only part of the adhesive storage area 12; or, the adhesive layer covers both part of the adhesive storage area 12 and part of the adhesive feed area 11; or, the adhesive layer covers all the adhesive storage area 12 and the adhesive feed area 11, that is, covers the entire adhesive overflow tank 10.

Figure 6:
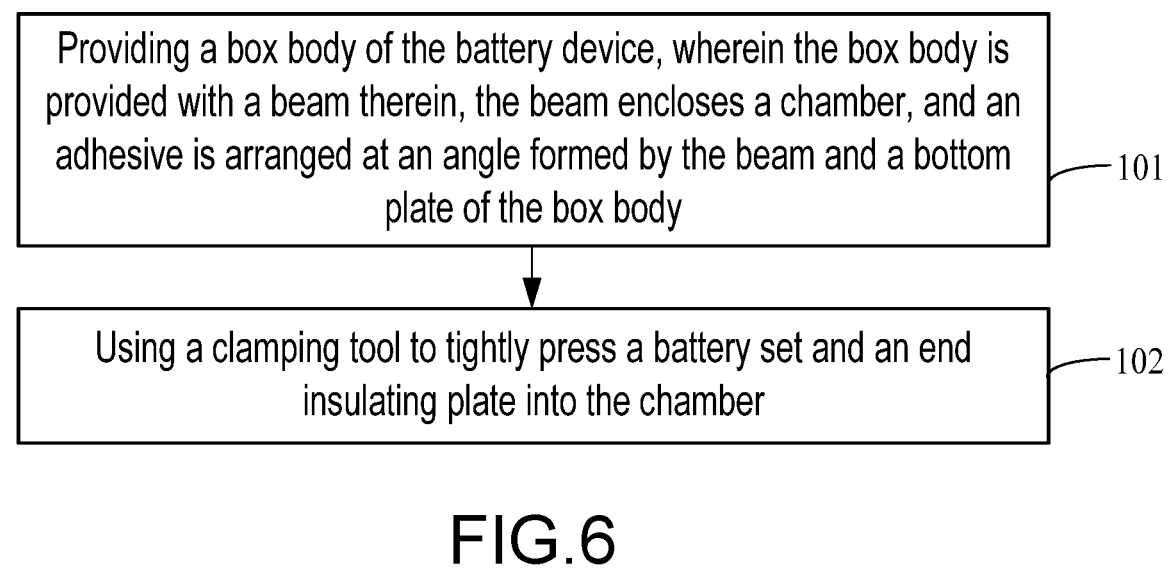

In a third aspect, the present disclosure provides an assembly method of a battery device, as shown in FIG. 6, the assembly method includes the following steps.

Step 101, as shown in FIG. 5, a box body 3 of the battery device is provided. The box body 3 is provided with a beam 31 therein, the beam 31 encloses a chamber, and adhesive 4 is arranged at the angle formed by the beam 31 and the bottom plate 32 of the box body 3.

Specifically, the beam 31 is used to enclose a chamber, and the chamber is used to accommodate the battery set 2. In this embodiment, adhesive is applied to the root of the beam 31 facing the inner side of the chamber.

Exemplarily, a strip of thermally conductive structural adhesive may be pre-applied to the roots of the two beams 31 in contact with the two end insulating plates 1 of the battery set 2.

It should be noted that the beam 31 referred to in this embodiment refers to the structure used to enclose the chamber, which may include the beam 31 normally located inside the box body 3 or the lateral frame of the box body 3, which may be specifically determined according to which structures are used to enclose the chamber. For example, if the chamber close to the lateral frame of the box body 3 is jointly enclosed by the lateral frame of the box body 3 and the beam 31 inside the box body 3, in this embodiment, the beam 31 includes both the beam 31 inside the box body 3 and a segment of lateral frame for enclosing the chamber.

Step 102, as shown in FIG. 2, FIG. 4 and FIG. 5, a clamping tool is used to tightly press the battery set 2 and the end insulating plate 1 into the chamber, and the end insulating plate 1 is arranged between the beam 31 and the battery set 2. An adhesive overflow tank 10 is provided at one side of the end insulating plate 1 facing away from the battery set 2. The adhesive overflow tank 10 includes an adhesive feed area 11 and an adhesive storage area 12. An adhesive feed port 13 is provided at one side of the adhesive feed area 11 facing the bottom surface of the end insulating plate 1; the adhesive storage area 12 communicates with the adhesive feed area 11, and a baffle structure 100 for blocking adhesive is provided at one side of the adhesive storage area 12 close to the bottom of the end insulating plate 1. The adhesive overflow tank 10 is configured to allow adhesive to enter the adhesive feed area 11 from the adhesive feed port 13, and enter the adhesive storage area 12 from the adhesive feed area 11. One side of the end insulating plate 1 provided with the adhesive overflow tank 10 faces the beam 31, and after the battery set 2 is assembled in place, the adhesive 4 is squeezed from the adhesive feed port 13 into the adhesive overflow tank 10.

Specifically, the single battery, the buffer spacer, and the end insulating plate 1 are stacked and assembled first to form a battery set 2. Then, the clamping tool cantilever is inserted into the pre-designed accommodating groove 18 on the end insulating plate 1, and the stacked battery set 2 is over-pressed into the box. When the battery set 2 is assembled in place, the pre-applied adhesive 4 may be squeezed into the adhesive overflow tank 10.

In the assembly method of the battery device provided in this embodiment, adhesive overflow is adopted to replace pasting, which may strengthen the bonding strength between the beam 31 and the battery set 2, and may reduce the difficulty in assembling the battery set 2 in place due to large-area pasting as well as prevent the adhesive from contacting other positions due to scratching and rubbing and so on. Therefore, the assembly yield of the battery device may be improved. The assembly method has high technological feasibility and may improve the production efficiency. In addition, in this embodiment, the adhesive overflow tank 10 includes an adhesive feed area 11 and an adhesive storage area 12. The adhesive may enter the adhesive feed area 11 from the adhesive feed port 13, and enter the adhesive storage area 12 from the adhesive feed area 11. Since a baffle structure 100 is provided under the adhesive storage area 12, it is possible to prevent the adhesive that flows downward from flowing out of the adhesive overflow tank 10 before being completely cured, so as to ensure the final adhesive amount and bonding area between the end insulating plate 1 and the beam 31, improve the bonding firmness, and then improve the adhesion between the battery set 2 and the beam 31. Moreover, the assembly yield of the battery device is further improved.

In some embodiments, as shown in FIG. 1, FIG. 2, FIG. 4 and FIG. 5, the bottom of the end insulating plate 1 is provided with an adhesive baffle plate 16. The adhesive baffle plate 16 may be bent, and is specifically configured to be bent toward one side of the end insulating plate 1 provided with the adhesive overflow tank 10, so as to push the adhesive 4 at the bottom of the end insulating plate 1 toward the adhesive overflow tank 10. Under the circumstances, in step 102, a clamping tool is used to tightly press the battery set 2 and the end insulating plate 1 into the chamber, which specifically includes the following.

From the process in which the adhesive baffle plate 16 of the end insulating plate 1 contacts the bottom plate 32 of the box body 3 to the process of assembling the battery set 2 in place, the adhesive baffle plate 16 is bent toward one side of the adhesive overflow tank 10 under the pressure of the bottom plate 32 of the box body 3, so that the adhesive 4 may be pushed from the adhesive feed port 13 into the adhesive feed area 11.

The adhesive baffle plate 16 may orientationally drive the adhesive to move, which facilitates adhesive squeezing and overflowing, so that the adhesive will not easily overflow or contact other positions, and the reduction of actual adhesive amount can be avoided, the bonding effect can be ensured, and the assembly yield of the battery device will not be affected. Therefore, the arrangement of the adhesive baffle plate 16 may further improve the assembly yield of the battery device, which facilitates industrial production.

Specifically, the battery device and the assembling method of the battery device provided by the present disclosure have the same inventive concept as the end insulating plate provided by the present disclosure, and have the same embodiments and advantageous effects, and the same description will not be repeated in the present disclosure.

Specifically, the battery device provided in this embodiment may be a battery pack or a large module. For example, in the case of a large module, the partition plate between the lateral plate of the module and the accommodating groove of battery is a beam. The bottom plate of box body of the battery device may include a liquid cooling plate and/or a bottom shield.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. An end insulating plate, which is used to be arranged in a battery device, wherein the battery device comprises a beam and a battery set, the end insulating plate is arranged between the beam and the battery set, an adhesive overflow tank is arranged at one side of the end insulating plate facing away from the battery set, the adhesive overflow tank comprises an adhesive feed area and an adhesive storage area, and an adhesive feed port is provided at one side of the adhesive feed area facing a bottom surface of the end insulating plate; the adhesive storage area communicates with the adhesive feed area, and a baffle structure for blocking an adhesive is provided at one side of the adhesive storage area close to the bottom surface of the end insulating plate; the adhesive overflow tank is configured to allow the adhesive to enter the adhesive feed area from the adhesive feed port, and enter the adhesive storage area from the adhesive feed area.

2. The end insulating plate according to claim 1, wherein the adhesive feed area and the adhesive storage area are arranged in a direction parallel to the bottom surface of the end insulating plate, and the adjacent adhesive feed area and the adhesive storage area are separated by a first partition plate and communicate with each other at one end of the first partition plate away from the bottom surface of the end insulating plate.

3. The end insulating plate according to claim 2, wherein the baffle structure is a second partition plate, and one end of the first partition plate close to the bottom surface of the end insulating plate is connected to the second partition plate.

4. The end insulating plate according to claim 2, wherein the adhesive overflow tank comprises at least the one adhesive feed area and the one adhesive storage area, the adhesive feed area and the adhesive storage area are alternately arranged, and each of the adhesive feed areas communicates with each of the adhesive storage areas.

5. The end insulating plate according to claim 2, wherein the adhesive overflow tank comprises one adhesive storage area and two adhesive feed areas located on both sides of the one adhesive storage area, and the one adhesive storage area communicates with the two adhesive feed areas adjacent thereto respectively.

6. The end insulating plate according to claim 2, comprising a plurality of the adhesive overflow tanks arranged in the direction parallel to the bottom surface of the end insulating plate, and support ribs are provided between the adjacent adhesive overflow tanks.

7. The end insulating plate according to claim 6, wherein the support ribs extend to a bottom of the end insulating plate.

8. The end insulating plate according to claim 2, wherein the one end of the first partition plate away from the bottom surface of the end insulating plate is inclined toward the adhesive feed area with respect to one end of the first partition plate close to the bottom surface of the end insulating plate.

9. The end insulating plate according to claim 2, wherein the one end of the first partition plate away from the bottom surface of the end insulating plate is inclined toward the adhesive storage area with respect to one end of the first partition plate close to the bottom surface of the end insulating plate.

10. The end insulating plate according to claim 2, wherein the one side of the end insulating plate facing away from the battery set is further provided with an exhaust slot, and the exhaust slot is located on one side of the adhesive overflow tank away from the bottom surface of the end insulating plate; one end of the exhaust slot is open, and the other end thereof communicates with the adhesive overflow tank.

11. The end insulating plate according to claim 1, wherein an adhesive baffle plate is disposed at a bottom of the end insulating plate, and the adhesive baffle plate is bendable and configured to be bent toward one side of the end insulating plate provided with the adhesive overflow tank, so as to push the adhesive at the bottom of the end insulating plate toward the adhesive overflow tank; at least part of the adhesive baffle plate is located at the adhesive feed port of the adhesive overflow tank.

12. The end insulating plate according to claim 11, wherein a weak portion is provided at a root of the adhesive baffle plate to facilitate bending, and the root is a portion where the adhesive baffle plate is connected to a main body of the end insulating plate.

13. The end insulating plate according to claim 1, wherein the one side of the end insulating plate facing away from the battery set is further provided with an accommodating groove, and the accommodating groove is located on one side of the adhesive overflow tank away from the bottom surface of the end insulating plate, and configured to accommodate a clamping tool cantilever, and the accommodating groove does not communicate with the adhesive overflow tank.

14. The end insulating plate according to claim 1, wherein the one side of the end insulating plate facing away from the battery set is further provided with an exhaust slot, and the exhaust slot is located on one side of the adhesive overflow tank away from the bottom surface of the end insulating plate; one end of the exhaust slot is open, and the other end thereof communicates with the adhesive overflow tank.

15. The end insulating plate according to claim 14, wherein the exhaust slot is a strip-shaped slot extending in a direction perpendicular to the bottom surface of the end insulating plate.

16. The end insulating plate according to claim 14, wherein the exhaust slot is located on one side of the adhesive storage area away from the bottom surface of the end insulating plate, and the exhaust slot communicates with the adhesive storage area.

17. A battery device, comprising a beam and a battery set, and the end insulating plate claimed in claim 1; wherein the beam encloses a chamber, and the end insulating plate and the battery set are arranged in the chamber, the end insulating plate is arranged between the beam and the battery set, and one side of end insulating plate provided with the adhesive overflow tank faces the beam.

18. The battery device according to claim 17, further comprising an adhesive layer located between the adhesive overflow tank and the beam, wherein the adhesive layer at least covers part of the adhesive storage area of the adhesive overflow tank.

19. An assembly method of a battery device, comprising the following steps:

providing a box body of the battery device, wherein the box body is provided with a beam therein, the beam encloses a chamber, and an adhesive is arranged at an angle formed by the beam and a bottom plate of the box body;

using a clamping tool to tightly press a battery set and an end insulating plate into the chamber, wherein the end insulating plate is arranged between the beam and the battery set, an adhesive overflow tank is provided at one side of the end insulating plate facing away from the battery set, the adhesive overflow tank comprises an adhesive feed area and an adhesive storage area, an adhesive feed port is provided at one side of the adhesive feed area facing a bottom surface of the end insulating plate; the adhesive storage area communicates with the adhesive feed area, and a baffle structure for blocking an adhesive is provided at one side of the adhesive storage area close to a bottom of the end insulating plate; the adhesive overflow tank is configured to allow the adhesive to enter the adhesive feed area from the adhesive feed port, and enter the adhesive storage area from the adhesive feed area; one side of the end insulating plate provided with the adhesive overflow tank faces the beam, and after the battery set is assembled in place, the adhesive is squeezed from the adhesive feed port into the adhesive overflow tank.

20. The assembly method of the battery device according to claim 19, wherein an adhesive baffle plate is disposed at the bottom of the end insulating plate, and the adhesive baffle plate is bendable and configured to be bent toward the one side of the end insulating plate provided with the adhesive overflow tank, so as to push the adhesive at the bottom of the end insulating plate toward the adhesive overflow tank;

wherein the step of using the clamping tool to tightly press the battery set and the end insulating plate into the chamber comprises:

from a process in which the adhesive baffle plate of the end insulating plate contacts the bottom plate of the box body to a process of assembling the battery set in place, the adhesive baffle plate is bent toward one side of the adhesive overflow tank under a pressure of the bottom plate of the box body, so that the adhesive is pushed from the adhesive feed port into the adhesive feed area.

* * * * *